United States Patent [19]
Morgan, Jr.

[11] 4,220,542
[45] Sep. 2, 1980

[54] FILTER HAVING AN INTERIOR LIQUID DISPLACEMENT MEANS

[75] Inventor: Howard W. Morgan, Jr., Michigan City, Ind.

[73] Assignee: Filter Specialists, Inc., Michigan City, Ind.

[21] Appl. No.: 14,267

[22] Filed: Feb. 23, 1979

[51] Int. Cl.² ............................................ B01D 23/04
[52] U.S. Cl. .................................................. 210/474
[58] Field of Search .............. 210/114, 119, 121, 232, 210/418–420, 446, 456, 474

[56] References Cited
U.S. PATENT DOCUMENTS

| | | | |
|---|---|---|---|
| 3,722,691 | 3/1973 | Francois | 210/456 X |
| 3,959,137 | 5/1976 | Kirsgalvis | 210/84 |
| 4,039,452 | 8/1977 | Fernandez | 210/456 X |
| 4,081,379 | 3/1978 | Smith | 210/232 |

*Primary Examiner*—William A. Cuchlinski, Jr.
*Attorney, Agent, or Firm*—Oltsch, Knoblock & Hall

[57] ABSTRACT

A filter having a housing in which a filtering medium such as a rigid screen and removable bag is located. A removable, hollow closed container is located within the filter housing inside the filtering medium. A spring is compressed between the container and the top of the filter to cause the container to be pressed into contact with the filtering medium.

3 Claims, 1 Drawing Figure

FILTER HAVING AN INTERIOR LIQUID DISPLACEMENT MEANS

SUMMARY OF THE INVENTION

This invention relates to a liquid filter and will have specific application to filtering apparatus which includes a liquid displacement device located within the filter to reduce the liquid volume in the filter without affecting the filter flow rate or capacity and for sealing a portion of the filter screen or bag to facilitate draining of the filter for cleaning or repair.

In this invention the filter disclosed in U.S. Pat. No. 3,959,137 is improved upon by providing a biasing device, such as a spring, which serves to urge the floatable closed container within the filter into contact with the filter screen or bag when the cap of the filter is placed over the filter housing. Accordingly, it is an object of this invention to provide a means of reducing the amount of waste liquid remaining in a filter at the time of cleaning or replacement of its filtering means or medium.

Another object of this invention is to provide a means of facilitating the draining of liquid from within a filter at the time of cleaning or replacement of its filtering means or medium.

Other objects of this invention will become apparent upon a reading of the invention's description.

BRIEF DESCRIPTION OF THE DRAWINGS

A preferred embodiment of this invention is shown wherein.

DESCRIPTION OF THE PREFERRED EMBODIMENT

Figure 1:
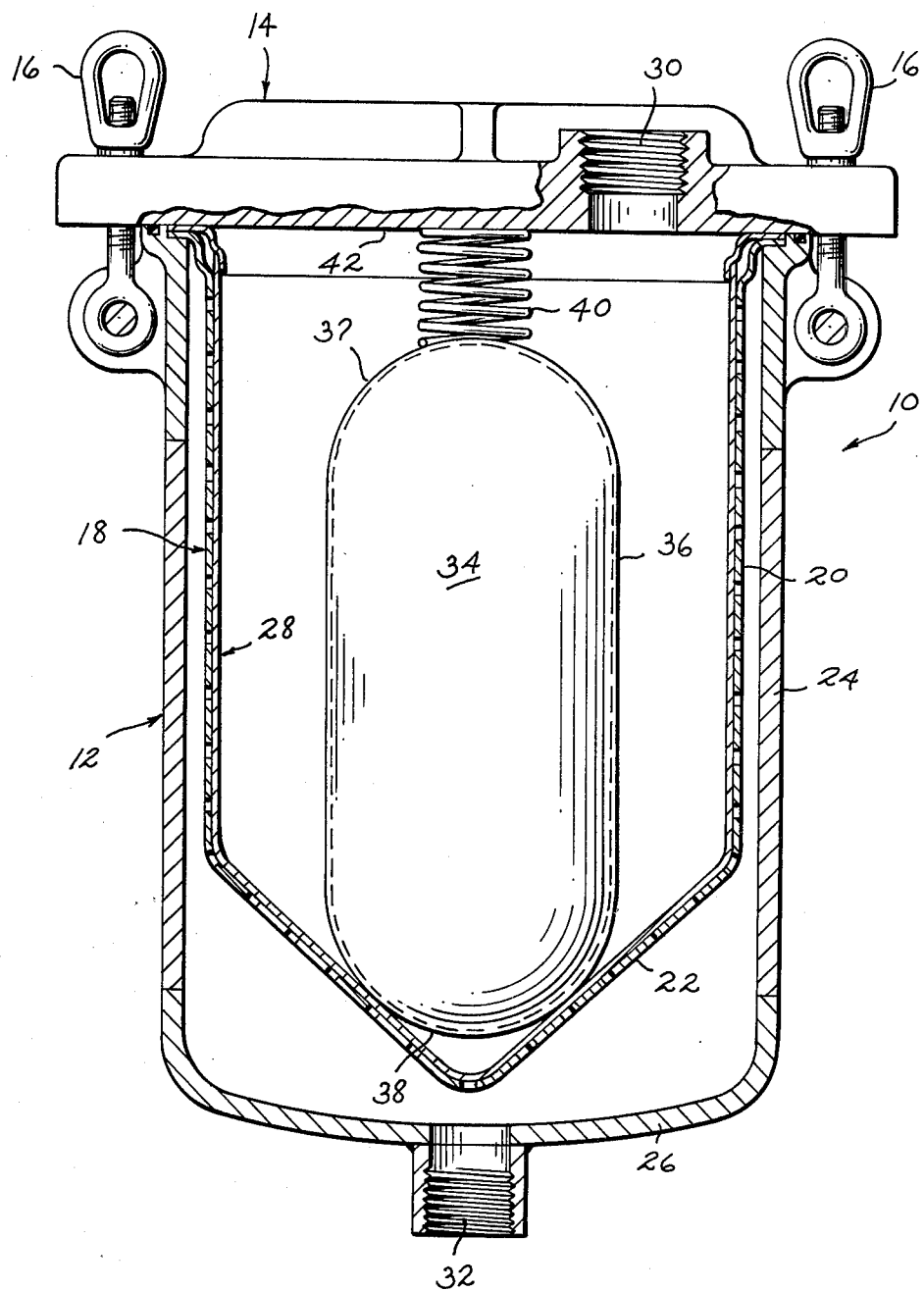
FIG. 1 is a longitudinal sectional view of the filter shown with its cap closed and with the improvement of this invention incorporated therein.

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

U.S. Pat. No. 3,959,137, granted May 25, 1976, is incorporated herein by reference. The filter 10 of FIG. 1 includes a filter housing having a base member 12 and a cap 14. Cap 14 is removably connected to base member 12 by means of hold-down clamps 16. A bag-shaped filtering screen 18 is supported by base member 12 within the filter housing. Screen 18 includes a cylindrical side wall 20 and a convex bottom wall 22, all spacedly positioned from side wall 24 and bottom wall 26 of base member 12. A porous filter bag 28, which is open at its top, fits within screen 18. The filter housing includes a liquid inlet 30 which is located at the upper end portion of the housing and which is in flow communication with the interior of filter bag 28 and a liquid outlet 32 which is located in the lower end portion of the housing.

A closed, hollow container 34 is positioned within filter bag 28. Container 34 is formed with a cylindrical side wall 36 and generally rounded end walls 37 and 38. The outer diameter of container side wall 36 is less than the inner diameters of filter bag 28 and screen 18 so that there is spacing for liquid flow between the container and the filter bag. Liquid flow upon entering the filter housing through inlet 30 flows around container 34 within the interior filter bag 28 and outwardly through the filter bag and screen 18 at a substantially unrestricted flow rate.

A helical spring 40 is placed in compression between cap 14 and container 34 with one end of the spring abutting the inner face 42 of the cap and the opposite end of the spring abutting end wall 37 of the container. Spring 40 serves to urge container 34 downwardly into contact with filter bag 28, causing the bag to be compressed against bottom wall 22 of screen 18 to seal a portion of the bag from the liquid flow through the filter.

When filter bag 28 becomes clogged during use, thereby necessitating its removal and cleaning or replacement, liquid flow through the filter is terminated and cap 14 opened to expose spring 40 and container 34. Spring 40 is removed and container 34 is then pulled upwardly out of the filter housing base member 12 with only a minimal amount of liquid remaining within bag 28. Additionally, that portion of the filter bag sealed by container 34 is thus exposed upon removal of the container to permit the remaining small amount of liquid within the bag to drain from the filter.

In the filter design of this invention container 34 may be designed with a differing volumetric shape and thus serve the same displacement and sealing function as the container described in U.S. Pat. No. 3,959,137 in FIG. 3 thereof with the aid of spring 40. Additionally, the use of spring 40 does not require container 34 of this invention to be constructed with angularly spaced projections which extend outwardly from the side wall of the container since the spring will maintain the container in a centralized location within the filter during filtering usage.

It is to be understood that the invention is not to be limited to the details above given, but that it may be modified within the scope of the appended claims.

What I claim is:

1. In a filter for a liquid, said filter including a housing having a base member and a removable cap, said base member having an open top and being defined by side and bottom walls, said cap spanning said base member top, a bag-shaped reticulated filtering means carried within said housing and having portions spaced from said base member, said housing having a liquid inlet means in flow communication with the interior of said filtering means and a liquid outlet means in said base member in flow communication with said spaced filtering means portions, a removable closed container means for decreasing the volumetric interior size of said filtering means, said container means fitting within said filtering means and having parts spaced from said filtering means to define liquid flow passage means from said inlet means to said spaced filtering means portions wherein liquid in passing through said filter from said inlet means to said outlet means will flow around said container means, said filtering means including an end wall and an open top, said container means having an end wall, said cap overlying the top of said filtering means, the improvement comprising biasing means interposed between said container means and cap for urging said container means end wall against said filtering means end wall, said outlet means opening into said base member at a location below where said container means end wall is urged by said biasing means against said filtering means end wall.

2. The filter of claim 1 wherein said biasing means is a spring compressed between said container means and cap.

3. The filter of claim 2 wherein said container means is hollow.